(12) United States Patent
Haswell et al.

(10) Patent No.: US 6,344,120 B1
(45) Date of Patent: Feb. 5, 2002

(54) METHOD FOR CONTROLLING LIQUID MOVEMENT IN A CHEMICAL DEVICE

(75) Inventors: Stephen John Haswell, Cottingham; Gillian Mary Greenway, South Cave; Thomas McCreedy, Hessle; Natalie Gayle Wilson; Victoria Skelton, both of Hull, all of (GB)

(73) Assignee: The University of Hull, North Humberside (GB)

( * ) Notice: Subject to any disclaimer, the term of this patent is extended or adjusted under 35 U.S.C. 154(b) by 0 days.

(21) Appl. No.: 09/598,246

(22) Filed: Jun. 21, 2000

(30) Foreign Application Priority Data

Jun. 21, 1999 (GB) ............................................... 9914493

(51) Int. Cl.$^7$ ............................................... B01D 61/42
(52) U.S. Cl. ........................ 204/450; 204/451; 204/454
(58) Field of Search ................................. 204/450, 451, 204/454

(56) References Cited

U.S. PATENT DOCUMENTS

| | | | |
|---|---|---|---|
| 3,920,400 A | 11/1975 | Scheibe et al. | |
| 4,759,907 A | 7/1988 | Kawolics et al. | |
| 5,507,945 A | 4/1996 | Hansen | |
| 5,580,448 A | 12/1996 | Brandreth, III | |
| 5,795,789 A | 8/1998 | Dietzen | |
| 5,858,188 A | 1/1999 | Soane et al. | |
| 5,858,195 A | 1/1999 | Ramsey | |

FOREIGN PATENT DOCUMENTS

| | | |
|---|---|---|
| EP | A1 0 010 456 | 4/1980 |
| EP | 029915 A1 | 6/1981 |
| EP | 168936 A1 | 1/1986 |
| EP | 408360 A2 | 1/1991 |
| GB | 1122586 | 8/1968 |
| GB | 2002516 A | 2/1979 |
| GB | 2085026 A | 4/1982 |
| JP | 59-186687 A | 10/1984 |
| JP | 11-10184 A | 1/1999 |
| WO | WO 98/37457 | 8/1998 |
| WO | WO 98/46438 | 10/1998 |
| WO | WO 99/29497 | 6/1999 |
| WO | 00/30606 A1 | 6/2000 |
| WO | 00/49396 | 8/2000 |

OTHER PUBLICATIONS

Christensen et al. The Fabrication of micro–porous silica structures for micro–reactor technology, (1998) Anal. Commun. pp. 341–343.*

Search Report under Section 17, Application No. GB 9914493.3, Date of Searched: Sep. 19, 2000.

S. J. Haswell, "Development and Operating Characteristics of Micro Flow Injection Analysis Systems Based on Electroosmotic Flow", The Analyst, Jan. 1997, vol. 122(1R–10R).

G.N. Doku, S.J. Haswell, "Further Studies Into the Development of a Micro–FIA($\mu$FIA) System Based on Electroosmotic Flow for the Determination of Phosphate as Orthophosphate", Analytica Chimica Acta 382 (1999) 1–13.

S.J. Haswell and N. Howarth, "Perturbation of a Solid Phase Separation Process By A Non–thermal Microwave Effect", Analytica Chimica Acta 387 (1999) 113–120.

(List continued on next page.)

Primary Examiner—Arun S. Phasge
(74) Attorney, Agent, or Firm—Leydig, Voit, & Mayer, Ltd.

(57) ABSTRACT

A method of controlling liquid movement in a chemical device comprising a porous structure involved applying an electrical potential to generate an electroosmotic force in the porous structure so as to propel a liquid through the porous structure. Also the porous structure is used to resist or prevent flow of a liquid through the porous structure in response to hydrostatic force.

10 Claims, 4 Drawing Sheets

OTHER PUBLICATIONS

P.D. Christensen, S.W.P. Johnson, T. McCreedy, V. Skelton & N.G. Wilson, "The Fabrication of Microporous Silica Structures for Micro–reactor Technology", Anal. Communication, 1998, 35, 341–343.

G.M. Greenway, S.J. Haswell & P.H. Petsul, "Characterization of a Micro–total Analytical System for the Determination of Nitrite With Spectrophotometric Detection", Analytica Chimica Acta 387 (1999) 1–10.

R.N.C. Daykin & S.J. Haswell, "Development of a Micro Flow Injection Manifold for the Determination of Orthophosphate", Analytica Chimica Acta 313 (1995) 155–159.

Nasser K. Budraa, H.W. Jackson, M. Barmatz, William T. Pike & John D. Mai, "Low Pressure and Low Temperature Hermetic Wafer Bonding Using Microwave Heating", Jet Propulsion Laboratory, California Institute of Technology, 3 pgs. (no date).

Stephen J. Haswell and Victoria Skelton, "Chemical and Biomedical Microreactors", Trends in Analytical Chemistry, vol. 19, No. 6, 2000, pp. 389–395.

Gillian M. Greenway, Stephen J. Haswell, David O. Morgan, Victoria Skelton, Peter Styring, "The Use of a Novel Microreactor for High Throughput Continuous Flow Organic Synthesis", Sensors and Actuators B 63 (2000) 153–158.

\* cited by examiner

METHOD FOR CONTROLLING LIQUID MOVEMENT IN A CHEMICAL DEVICE

BACKGROUND OF THE INVENTION

1. Field of the Invention

The invention relates to chemical devices, methods for manufacturing chemical devices and methods for use with chemical devices. The term "chemical devices" is used in this specification to include devices used for performing chemical reactions (including biochemical reactions) and/or for performing analysis and separation of chemical (including biochemical) substances. Such analysis and separation of chemical substances may or may not include performing chemical reactions.

2. Description of Related Art

A known type of chemical device is a chip-type chemical device. A chip-type chemical device is formed from a first member (usually a plate of glass, metal, polymer, silicon or quartz) that has a surface portion and at least one groove (more usually a plurality of interconnected grooves) located at the surface portion, and a second member (usually a block formed of glass, metal, polymers silicon or quartz) having a co-operating surface portion. The surface portions are connected together such that the groove (or the plurality of interconnected grooves) is closed to form a channel (or a plurality of interconnected channels). Reagents and other chemical substances may be passed through the channel (or the plurality of interconnected channels) in a controlled manner so as to perform chemical reactions, or analysis or separation of chemical substances. One method of causing liquid reagents (including solutions) to move through channels of chemical devices is to induce an electroosmotic force by applying a voltage. A discussion of this is provided in an article by S.J Haswell entitled "Development and Operating Characteristics of Micro-Flow Injection Analysis Systems based on Electroosmotic Flows" in Analyst, January 1997, vol.122 (1R–10R), which article is incorporated herein by reference.

For most purposes, the current preferred method of connecting the surface portions of glass members is by heating the members to a temperature close to their upper annealing temperature while the surface portions are contacting one another. This results in direct thermal connection (also called thermal bonding or annealing) of the surface portions—that is to say direct thermally induced bonding together of the surface portions without any intervening link or extraneous adhesive.

SUMMARY OF THE INVENTION

In accordance with a first aspect of the invention, there is provided a method of manufacturing a chemical device comprising, providing a first member with a surface portion and a groove located at the surface portion, a second member with a surface portion, and means heatable by electromagnetic irradiation, positioning the members and the means so that the means lies between the surface portions, aid heating the means by electromagnetic irradiation to effect or assist linking of the surface portions by the means so as to close the groove to form a channel. In accordance with a second aspect of the invention, there is provided a method of manufacturing a chemical device comprising, providing first and second members having respective surface portions, and means heatable by electromagnetic irradiations positioning the members and the means relative to one another so that the means is positioned for providing localised heating of at least one of the surface portions on heating of the means by electromagnetic irradiation, irradiating with electromagnetic radiation so as to cause said localised heating, and connecting the surface portions together so that the surface portions cooperate to define a channel, the localised heating effecting or assisting said connection.

According to a third aspect of the invention, there is provided a chemical device comprising a first member with a surface portion and a groove located at the surface portion and a second member with a surface portion, the surface portions being linked by an electromagnetic irradiation heatable layer such that the groove is closed to form a channel.

According to a fourth aspect of the invention, there is provided a method of controlling liquid movement in a chemical device comprising a porous structure, the method comprising applying an electrical potential to generate an electroosmotic force in the porous structure so as to propel a liquid through the porous structure, and using the porous structure to resist or prevent flow of a liquid through the porous structure in response to hydrostatic force.

Controlling the flow of liquids in this way may be used to reduce or prevent undesired flow and mixing of liquids due to hydrostatic force.

According to a fifth aspect of the invention, there is provided a method of preparing a working solution of a substance at a desired concentration in a chemical device comprising, providing a substance in a soluble form in a chemical device, contacting the substance with a solvent for the substance in the device, and controlling said contact between the substance and the solvent so as to produce a working solution of the substance in the solvent at a concentration dependent on said control.

The ability to prepare working solutions of a desired concentration in this way may be useful when it is not practicable to introduce externally prepared working solutions into the chemical device. This may be of utility in applications such as environmental monitoring, where chemical devices are required to perform monitoring operations repeatedly over some length of time without external maintenance.

BRIEF DESCRIPTION OF THE DRAWINGS

The following is a mote detailed description of embodiments of the invention, by way of example, reference being made to the appended schematic drawings in which.

DESCRIPTION OF THE PREFERRED EMBODIMENTS

Figure 1:
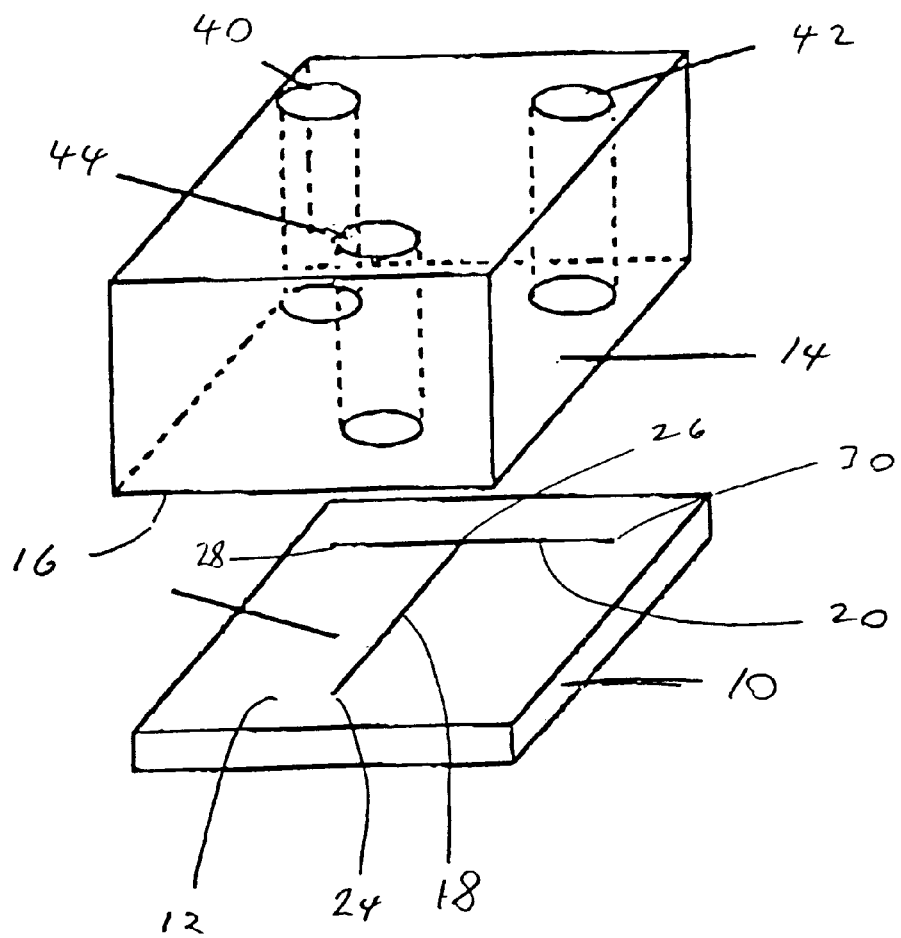
FIG. 1 shows a first stage in the manufacture of a chip-type chemical device.

Method 1—Method of Manufacturing a Chip-type Chemical Device Referring to FIG. 1, the chip-type chemical device is formed from a plate 10 of borosilicate glass having a smooth, upper, planar surface 12 and a block 14 of borosilicate glass having a smooth, lower, planar surface 16. First and second grooves 18,20 are formed in the planar surface 12 of the plate 10. The grooves 18,20 are formed by coating the planar surface 12 with chromium and photoresist, and then using photolithography and wet etching. The process is described in the journal *Analyst*, Jan. 1997, 122(1R–10R).

The first groove 18 has first and second ends 22,24. The first end 22 of the first groove 18 meets the second groove 20 at a junction 26 that lies intermediate first and second ends 28,30 of the second groove 20 so that the first and second grooves together form the shape of a T. Each groove 18,20 is approximately 300 µm wide and 115 µm deep.

After the formation of the grooves 18,20 the remaining chromium and photo-resist are removed. This is done by, firstly, exposing the plate 10 to strong ultraviolet light for one to two hours before dipping the plate 10 in photoresist remover for two to three hours. The plate 10 is then rinsed with water and any remaining photoresist and chromium are removed using Micro-posit Chrome Etch 18.

Figure 2:
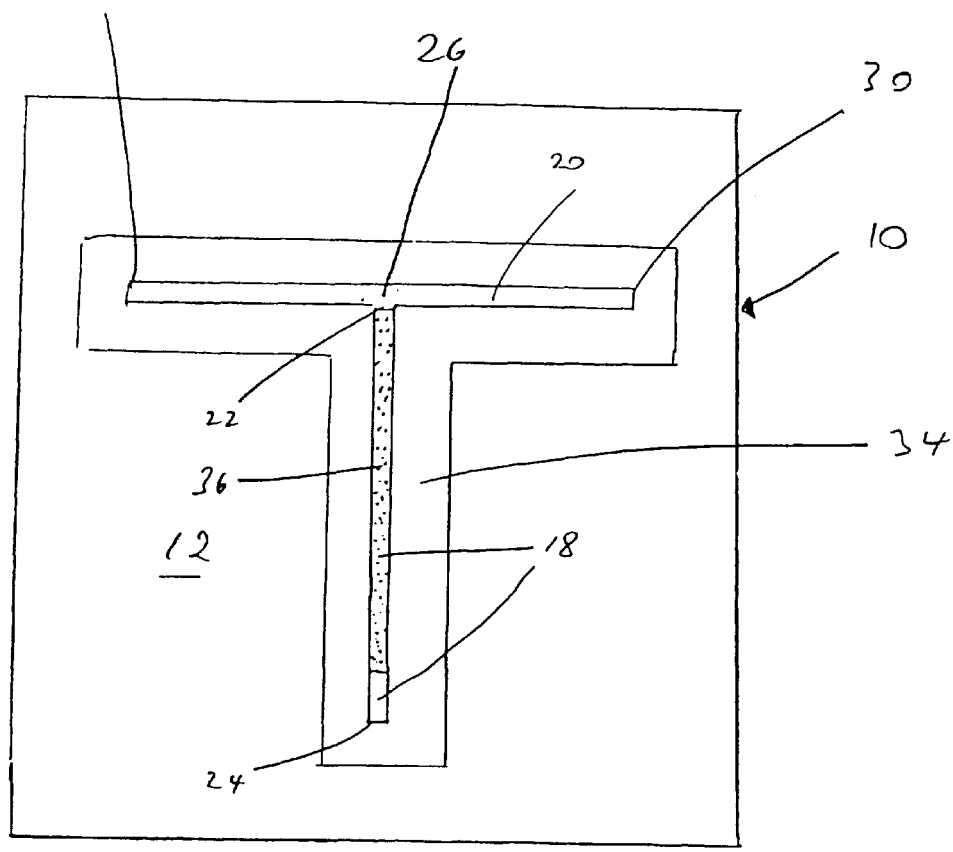
FIG. 2 shows a second stage in the manufacture of the device.

A portion of the planar surface 12 of the plate 10 is then provided with a coating 34 of chromium. The coating 34 (and also the portion) extends, as a relatively narrow strip, around the T shape formed by the two grooves 18,20, as shown in FIG. 2. Hence, the coating 34 does not cover the whole of the surface 12. The coating 34 is formed by first coveting the whole planar surface 12, and also the inner surfaces of the grooves 18,20, with a layer of chromium. The chromium is then coated with photoresist and the photoresist and the chromium are then removed from the internal surfaces of the grooves 18,20 and the regions of the planar surface 12 where chromium is not required using standard photolithography and removal methods. Finally, the remaining photoresist is removed to leave the desired chromium coating 34.

As an alternative to forming the chromium coating 34 as described above, an identical chromium coating may be formed from the chromium used during the formation of the grooves 13,20. The chromium remaining after the formation of the grooves 18,20 (which covers the whole surface 12 of the plate 10 but not the surfaces of the grooves) is, instead of being totally removed as described above, removed selectively so as to leave chromium covering the portion (as described above with reference to FIG. 2) of the surface 12 of the plate 10.

A micro-porous silica structure 36 is then produced so as to fill a region of the first groove 18 that extends from the first end 22 of the first groove 18 to a point near the second end 24 of the first groove 18 (see FIG. 2). The silica structure 36 fills the whole volume of the groove 18 in the region and also extends slightly above the groove 18 so as to fill the space lying between the portions of the coating 34 disposed at either side of the region.

The silica structure 36 is produced as follows A solution of formamide (10% v/v), and potassium silicate (21% $SiO_2$, 9% $K_2O$, Prolabo) is prepared at room temperature. The solution is mixed for 30 seconds using a glass rod and allowed to stand for an additional two minutes. Blu-Tac (trade mark) plugs are pressed into the grooves 18,20 at either side of the region that is to receive the silica structure 36. The solution, having stood for the two minutes, is then mixed with silica bonded catalyst and introduced into the region of the first groove 18 between the Blu-Tac plugs. The solution is added until it reaches the top of the coating 34. The silica bonded catalyst can be, for example, silica bonded palladium.

The plate 10 is then heated to 100° C. for one hour during which the solution solidifies to form the micro-porous silica structure 36 containing the silica supported catalyst. The micro-porous silica structure 36 is then washed with a $2 \times 10^{-2}$ mol $dm^{-3}$ solution of disodium tetraborate buffer in order to remove unreacted reagent.

The block 14 is then prepared by drilling first, second and third cylindrical holes 40,42,44 through the planar surface 16 and through the block 14, as shown in FIG. 1. The axes of the holes 40,42,44 have the same relative spacing as the first and second ends 28,30 of the second groove 20 and the second end 24 of the first groove 18. The planar surface 12 of the plate 10 is then linked to the planar surface 16 of the block 14. To do this, the block 14 is placed over the plate 10 such that the planar surfaces 12,16 face one another and are separated by the chromium coating 34. The axis of the first hole 40 passes through the first end 28 of the second groove 20, the axis of the second hole 42 passes through the second end 30 of the second groove 20, and the axis of third hole 44 passes through the second end 24 of the first groove 18.

The plate 10 and the block 14 are then positioned, in the orientation described above, in the heating cavity of a microwave furnace (CEM Microwave Ashing System 300), which is subsequently operated. The microwave furnace heats by microwave irradiation and by convective and conductive heating. However, the microwave irradiation causes the chromium coating 34 to heat more quickly than the borosilicate glass of the plate 10 and the block 14. This is because the chromium has a higher tan δ ratio than the borosilicate glass for the microwave frequency used (the tan 67 ratio=∈"/∈'. Where ∈" is dielectric loss—a measure of the efficiency with which absorbed microwave radiation is converted into heat, and ⌴' is dielectric constraint—a measure of the ability of a substance to be polarised in the electrical field of a microwave).

Heating is continued until the chromium coating 34 reaches a temperature at which the chromium coating 34 bonds to the overlying portion of the planar surface 16 of the block 14. This will occur when the chromium coating 34 is near the upper annealing temperature of the borosilicate glass of the block 14. The portion of the planar surface 12 on which the coating 34 is provided and the overlying portion of the planar surface 16 of the block are heated by the chromium coating 34. However, elsewhere, the plate 10 and the block 14 are at significantly lower temperatures.

Once the chromium coating 34 has bonded to the overlying portion of the planar surface 16 of the block 14 the plate 10 and the block 14 are allowed to cool slowly so as to avoid cracking.

Hence, in this method, the chromium coating 34 links portions of the planar surfaces 12,16.

Figure 3:
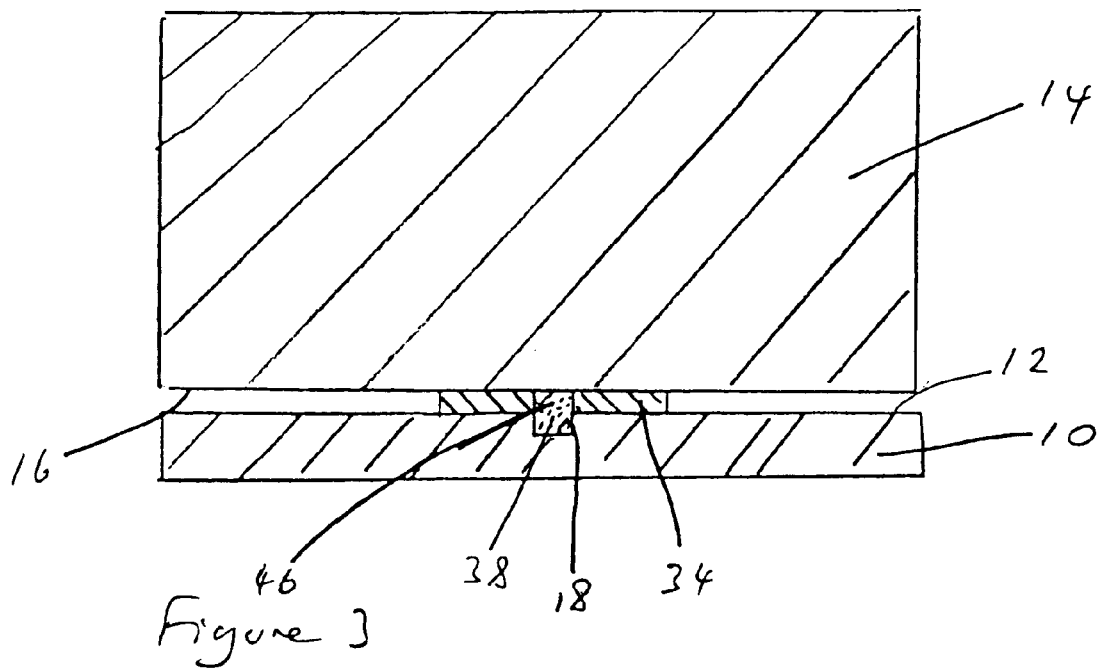
FIG. 3 is a cross-sectional view (not to scale) of the completed device.

The completed chip-type chemical device is shown in FIG. 3 (in which the depth of the coating 34 is exaggerated for clarity). The linking of the portions of the planar surfaces 12,16 by the chromium coating 34 results in the first and second grooves 18,20 being closed to form, respectively, first and second interconnecting channels (the first channel shown at 46, the second channel not shown). Each channel 46 is defined by the corresponding groove 18,20, together with adjacent regions of the chromium coating 34 and the planar surface 16 of the block 14. Hence, the two channels 46 interconnect at the junction 26 and the second channel (corresponding to the second groove 20) has a first portion (not shown) that extends from the junction 26 to the first end 28 of the second groove 20 and a second portion (not shown) that extends from the junction 26 to the second end 30 of the second groove 20.

It will be appreciated that the silica structure 36 fills the volume of the first channel 46 at the region where it is situated.

The first, second and third holes 40,42,44 form respective reservoirs that (with the exception of communicating with the channels 46) are closed at the planar surface 16 of the block 16 by the chromium coating 34. Hence, the reservoir formed by the first hole 40 communicates with the first portion of the second channel at the first end 28 of the second groove 20. The reservoir formed by the second hole 42 communicates with the second portion of the second channel at the second end 30 of the second groove 20. The reservoir formed by the third hole 44 communicates with the first channel 46 at the second end 24 of the first groove 18.

Linking of the plate 10 and the block 14 as described above is advantageous over connection by conventional thermal connection. Firstly, as the linking is effected while the plate 10 and the block 14 are for the main part, at significantly lower temperatures than those required for conventional thermal connection, the time required for linking and cooling may be significantly less than that required for conventional thermal connection and cooling. Secondly, conventional thermal connection has a high failure rate—it is common for connection to be incomplete, especially in the region of the grooves 18,20. This problem may be ameliorated by linking using the chromium coating 34.

Method 2—Method of Manufacturing a Chip-type Chemical Device

Figure 4:
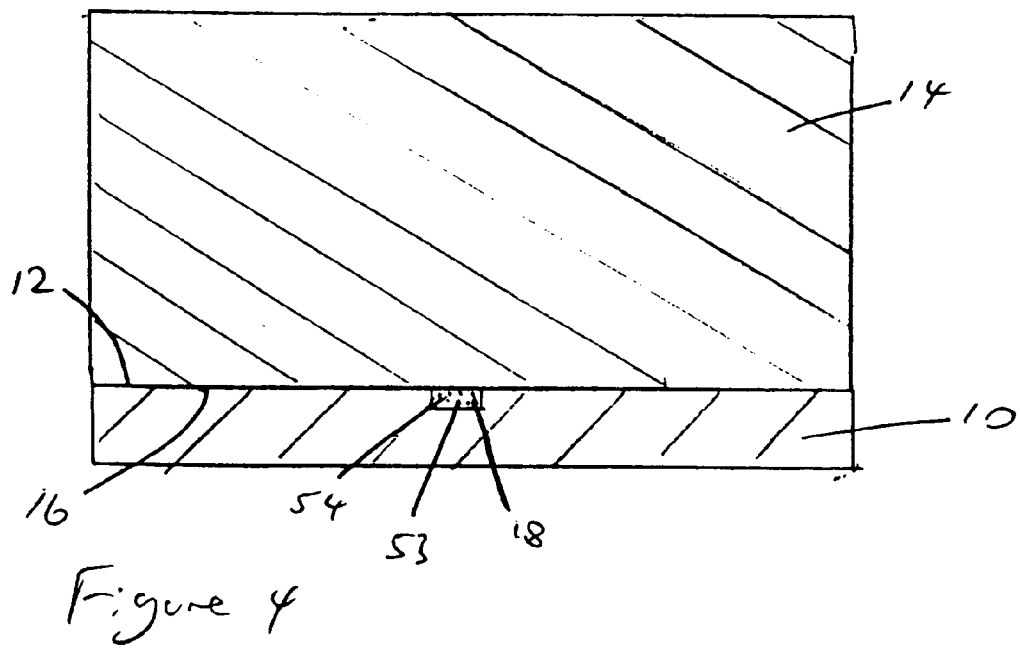
FIG. 4 is a cross-sectional view of a second chip-type chemical device.

The second method is used to manufacture a second chip-type chemical device (show in FIG. 4). Components used in the second method that are common to the first and second methods are not described in detail below and, to the extent that they are shown in FIG. 4, are given the same reference numerals as those used above in respect of the first method.

The second chip-type chemical device is formed from a plate 10 and a block 14 identical to the plate 10 and the block 14 of the first method. First and second grooves 18 (second groove not shown) are formed in the planar surface 12 of the plate 10, as described for the first method. The first and second grooves 18 have the same configuration as the first and second grooves 18,20 of the first method.

After the grooves 18 have been formed and the chromium and photoresist remaining from their formation have been removed, as described above, a micro-porous silica structure 53 containing a silica bound catalyst is formed in a region of the first groove 18 that extends form the first end (not shown) of the first groove 18 to a point near the second end (not shown) of the first groove 18. The silica structure 53 completely fills the volume of the first groove in this region, but, unlike the silica structure of the first method, does not extend above the top of the groove 18 (as there is no chromium coating 34). The silica structure 53 is formed in the same way as silica structure 36 of the first method except that the solution is added to the region of the first groove 18 up to the top of the first groove 18 (not up to the top of the chromium coating 34). As for the first method, the silica bonded catalyst can be silica bonded palladium.

A portion of the planar surface 12 of the plate 10 is then provided with a coating of an organic material (not shown). The coating (and also the portion) extends, as a relatively narrow step, around the T-shape formed by the taco grooves 18 in the same manner as the chromium coating 34 of the first method. The coating is applied in a conventional manner using masks to prevent coating of the internal surfaces of the grooves 18, of the microporous silica structure 53 and of the regions of the planar surface 12 where coating is not required.

The organic material of the coating is chosen so that the coating will be heated more quickly than the plate 10 and the block 14 by the microwave radiation used in the microwave furnace—it will have a higher tan δ ratio than the borosilicate glass for the microwave frequency used. Additionally, the organic material should be such that the coating vaporizes at a temperature either in the same region or slightly lower than the temperature required for conventional thermal bonding of the plate 10 and the block plate 14. Photoresist may be used to form the coating.

The block 14 is prepared as described above in the first method. The block 14 is then placed over the plate 10, as described above in the first method, so that the planar surfaces 12,14 face one another and are slightly separated by the organic coating. The. plate 10 and the block 14 are then placed, in this orientation, in the microwave furnace.

The microwave furnace is then operated. The microwave irradiation causes the organic coating to heat more quickly than the borosilicate glass of the plate 10 and the block 14. In turn, the organic coating heats the portion of the planar surface 12 on which the coating is provided and the overlying portion of the planar surface 16 of the block 14. When these portions of the surfaces 12,16 have been heated to a temperature suitable for thermal bonding of the portions, the organic coating vaporizes and the vapour escapes from between the surfaces 12,16. The vaporization of the organic coating brings the portions of the surfaces 12,16 into intimate contact and direct thermal connection of the portions occurs. For the most part, other than immediately adjacent the organic coating, the plate 10 and the block 14 remain at significantly lower temperatures than that required for thermal bonding.

The plate 10 and the block 14 ate then cooled slowly to avoid cracking.

The chip-type chemical device formed by method 2 is shown in FIG. 4. The connection of the portions of the planar surfaces 12,16 closes the first and second grooves 18 so as to form, respectively, two interconnecting channels 54, (channel corresponding to second groove not shown). As indicated in FIG. 4, each channel 54 is defined by the corresponding groove 18 and a region of the planar surface 16 of the block 14. The first, second and third holes 40,42,44 form reservoirs in a similar manner to that described above for the first method, but the reservoirs are closed (with the exception of communicating with the channels 54) by planar surface 12 of the plate 10.

It will be appreciated that various modifications may be made to the first and second methods. For example, whereas it is advantageous to provide the chromium coating 34 or the organic coating only on the portion of the planar surface 12 immediately surrounding the grooves 18,20 as this reduces the bulk temperatures of the plate 10 and the block 14 during connection, it is not essential to do this. Alternatively, the chromium coating 34 or the organic coating could be provided over the whole area of the planar surface 12 of the plate 10.

It is not necessary to use a coating at all. Other microwave heatable means may be used. For example, metal elements could be incorporated into the plate 10 so as to lie just below the portions of the planar surface 12 that surround the grooves 18,20. Alternatively, metal elements could be incorporated in a similar manner into the block 14. During microwave irradiation, the metal elements would heat appropriate portions of the planar surface 12 or the planar surface 16 so as to assist or effect thermal connection of the plate 10 and the block 14.

Alternatively, instead of the coatings, a microwave heatable membrane having an appropiate shape could be placed between the planar surfaces 12,16.

The microwave heatable means could also be a layer or layers of grease and dust, such as might be deposited by handling, on one or both of the planar surfaces 12,16.

Instead of being formed on the plate 10, the grooves 18,20 could be formed on the surface 16 of the block 14.

The plate 10 and the block 14 need not be formed of glass, they can be made of any suitable material (e.g. metal, plastic, silicon, quartz).

Method 3—Method of Controlling Liquid Flow in a Chemical Device

In the third method, the chip-type chemical device produced by the first method and shown in FIG. 3 is used to perform a chemical reaction, the microporous silica structure 36 controlling movement of liquids through the device.

A first liquid reagent is placed into the reservoir formed by the second hole 42 (see FIGS. 1, 2 and 3). The first liquid reagent passes along the second portion of the second channel until it contacts the microporous silica stricture 36. The reagent is drawn into the microporous silica structure 36 by hydrostatic forces by applying either a negative pressure at hole 44 whilst sealing hole 40 or by applying a position pressure to hole 42 whilst sealing hole 40.

A second liquid reagent is then added to the reservoir formed by the first hole 40. Tile second liquid reagent enters the first portion of the second channel and passes to the junction 26 and to the microporous silica structure 36, again under hydrostatic pressure.

A volume of the second liquid reagent, or a suitable solvent, is then added to the reservoir formed by the third hole 44 and passes to the microporous silica structure 36.

At this stage, the small size of the pores of the microporous silica structure 36 prevents the first and second liquid reagents, or the solvent where applicable, flowing trough the silica structure 36 in response to hydrostatic forces caused by heads of the liquids in the reservoirs. Although a small amount of mixing of the first and second liquid reagents may occur in the microporous silica structure 36, mixing of the liquid reagents is largely avoided. It will be appreciated that the ability of the microporous silica structure 36 to largely prevent mixture of the first and second liquid reagents, until it is desired to start the reaction by applying an electrical potential, is highly advantageous for some applications.

During the above procedure, as the liquid reagents pass through the channels, air is driven ahead of the reagents and passes through the silica structure 36.

The first and second liquid reagents (and, if applicable, the solvent in the reservoir formed by the third bole 44) now provide continuous electrical pathways between any two of the reservoirs. Voltages are then applied using a voltage generating device having a plurality of power supplies grounded against a common ground. First and second positive electrodes of the devices connected to respective first and second power supplies, are placed, respectively in the reservoirs formed by the first and second holes 40, 42 so that the electrodes contact the liquid reagents. An electrode connected to the common ground is placed in the reservoir formed by the third hole 44 so that the ground electrode contacts the liquid in that reservoir. The device is operated to apply positive DC voltages to the liquids in the reservoirs formed by the first and second holes 40, 42 (relative to the liquid in the reservoir formed by the third hole 44). The voltages applied to the liquid reagents in the reservoirs formed by the first and second holes 40, 42 can be different from one another.

In general the voltages applied will correspond to a voltage field of about 100–200V per cm of channel separating the reservoir to which the voltage is applied from the reservoir that is grounded. Thus, for example, if the length of the first portion of the second channel and the length of the first channel 46 together amount to 3 cm, then the length of channel separating the reservoir formed by the first and third holes 40, 44 is 3 cm. A voltage of 450V could be applied to the liquid in the reservoir formed by the first hole 40 to achieve a voltage field of 150V/cm between this reservoir and the grounded reservoir. The current may be about 50 microamps or less.

The electrical potential generates electroosmotic forces in the first and second channels and in the microporous silica structure 36. The electroosmotic forces propel the first liquid reagent from the reservoir formed by the second hole 42 to the reservoir formed by the third hole 44 and propels the second liquid reagent from the reservoir formed by the first hole 40 to the reservoir formed by the third hole 44. The flow of each reagent can be either continuous or intermittent. Intermittent flow is achieved by switching the voltage on and off in the reservoir (hole 40 or 42) containing the reagent for which intermittent flow is required.

During this process, the reagents mix at the junction 26 and the mixture passes through the microporous silica structure 36 where the bound catalyst catalyses reaction of the reagents. The product is collected in the reservoir formed by the third hole 44.

As the product (which is a liquid) collects in the reservoir formed by the third hole 44, the bead or height of the product above the silica structure 36 gradually increases. This in turn exerts an increasing hydrostatic force on the product urging the product to flow back through the silica structure 36 in the opposite direction to the electroosmotic flow described above. However, the microporous silica structure prevents such back flow of product due to capillary resistance. This allows chemical control under diffusion conditions to pertain in the second channel and throughout the silica structure 36.

The third method could also be performed using the chip-type chemical device produced by the second method. Alternatively, in a similar manner, porous structures can be used to prevent or resist hydrostatic pressure driven liquid flow in chemical devices having any configuration, as will be understood by the skilled worker in this field. For example, in a chemical device having a plurality of reservoirs, each reservoir being in fluid communication with a network of channels, respective porous structures can be provided between each reservoir and the network, to resist hydrostatic driven flow of liquid from the reservoirs to the network.

In a specific example of the third method, using the chip-type device of FIG. 3, a solution of phenylboronic acid (0.1M in a mixture of tetrahydrofuran (75%) and water (25%) is added to the reservoir formed by the second hole 42 (the first liquid reagent). A solution of 4-bromobenzonitrile (0.1M) also in tetrahydrofuran (75%)/water (25%) is added to the reservoir formed by the first hole 40 (the second liquid reagent). The solvent mixture, tetrahydrofuran (75%)/water (25%), is added to the reservoir formed by the third hole 44. Air is removed from the system as described above.

At this stage, as discussed above, the small size of the pores of the microporous silica structure 36 prevents the phenylboronic acid solution, the 4-bromobenzonitrile solution, and the solvent from passing through the silica structure 36 in response to hydrostatic forces caused by beads of the liquids in the reservoirs. In this way mixing of the solutions of phenylboronic acid and 4-bromobenzonitrile is largely prevented.

The catalyst is silica bound palladium, incorporated into the silica structure 36 as described above.

A constant DC voltage (in the range +100 to 400V relative to the reservoir formed by the third hole 44) is then applied to the reservoir containing the phenylboronic acid solution. This causes the phenylboronic acid solution to move continuously from the reservoir formed by the second hole 42 through the silica structure 36 to the reservoir formed by the third hole 44. A DC voltage (+200V relative to the reservoir formed by the third hole 44) is then applied intermittently to the reservoir containing the 4-bromobenzonitrile solution. The intermittent application of voltage causes corresponding intermittent flow of the 4-bromobenzonitrile solution from the reservoir formed by the first hole 40 through the silica structure 36, to the reservoir formed by the third hole 44. For example voltage may be applied to the reservoir containing the 4-bromobenzonitrile solution for 5 second intervals separated by 25 second intervals during which no voltage is applied to the reservoir containing the 4-bromobenzonitrile. In this way, the 4-bromobenzonitrile is pulsed through the silica structure 36 and to the reservoir formed by the third hole 44. During the intervals in which the 4-bromobenzonitrile solution flows as discussed above, the 4-bromobenzonitrile mixes with the phenylboronic acid in the silica structure 36. The two reagents react, catalysed by the palladium, so as to form cyanophenyl), which collects in the reservoir formed by the third hole 44. Yields of about 62% are achieved.

As the cyanobiphenyl collects in the reservoir formed by the third hole 44, the head of liquid in this reservoir increases and this increases the hydrostatic pressure urging flow from the reservoir formed by the third hole 44 to the reservoirs formed by the first and second holes 40, 42. As discussed above, the microporous silica structure prevents such back flow due to capillary resistance. This allows chemical control under diffusion conditions to pertain in the second channel and throughout the silica structure 36.

Method 4—Method of Preparing a Working Solution of a Substance at a Desired Concentration in a Chemical Device The fourth method allows a solution of a substance to be prepared at a desired concentration in a chemical device. The desired concentration may be, for examples any concentration of a reagent suitable for conducting a chemical reaction, any concentration of a reagent suitable as a standard in an assay, or more concentrated stock solutions that are intended to be diluted (e.g. serially diluted) before being used for performing chemical reactions or being used as standards in assays. Typical concentrations may be, for example, in the percentage range (wt/vol) down to parts per billion.

The method may be used with a chip-type chemical devices of the types manufactured using the first and second methods. Normally, the fourth method will be used with chip-type chemical devices having more complex arrangements of interconnecting channels than those described in the first and second methods.

Figure 5:
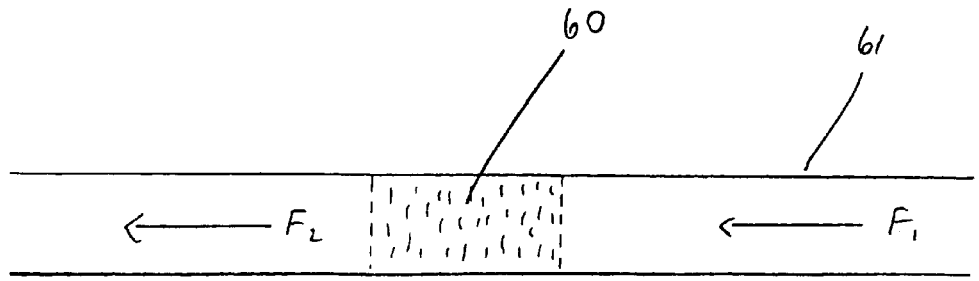
FIG. 5 is a schematic representation of a first embodiment of a method of preparing a working solution.

As shown in FIG. 5, in a first embodiment of the fourth method, a porous solid substance 60, from which it is desired to make the working solution, is provided in a channel 61 of a chip-type chemical device having a plurality of channels. This may be done either by passing the substance through a hole in one of the members from which the device is formed or by positioning the solid substance in a groove before the members are connected together such that the connection closes the groove to form the channel containing the substance. The channel having the substance is narrow (generally having a width of 500 $\mu$m or less). The substance 60 is fixed in the channel 61—for example by forming porous silica structures, as described above in method one (but omitting the catalyst), on either side of the substance 60. The porous solid substance 60 can be, for example, any substance that might be used, in solution, in a chemical reaction or in any assay. For example, the porous solid could be a porous form of sodium carbonate, a porous form of sodium sulphate, or a porous form of potassium sulphate. In this context the terms "porous form" and "porous solid substance" include a plurality of particles packed together so that solvent can permeate between the particles.

When it is desired to prepare the working solution, a solvent for the substance is passed through the channel 61 such that the solvent passes through the porous substance 60. As solvent passes through the substance, the solvent will dissolve the substance to form the working solution. In FIG. 5, the arrow F1 indicates solvent flowing towards the substance 60 and the arrow F2 indicates the working solution flowing from the substance 60. The solvent can be any solvent for the porous substance 60 that is compatible with the final use of the solution of the porous substance 60. For example, when the porous substance is sodium carbonate, sodium sulphate or potassium sulphate the solvent can be water. The rate at which the solvent is passed through the substance determines the concentration of the substance in solution in the solvent that has passed through the porous solid substance. Hence, the rate of solvent flow is controlled to achieve a working solution of desired concentration. When the solid substance is sodium carbonate, sodium sulphate or potassium sulphate, and the final use of the working solution is as a reagent in a chemical reaction or as a stock solution, the desired concentration may be in the micromolar or millimolar ranges. Exemplary flow rates of the solvent (and of the working solution) are from about 1 $\mu$l/min to about 100 $\mu$l/min, although greater and lower rates may be used.

The channel in which the substance is provided is sufficiently narrow so that dissolution of the substance is diffusion limited. This can be achieved by choosing conditions, as known in the field of fluid dynamics, so that the Reynolds number is less than 10, preferably less than 1. In general, the maximum channel width will be less than 500 $\mu$m, preferably less than or equal to 100 $\mu$m.

The working solution may be used as a reactant or as a calibration standard.

When the desired volume of the working solution has been prepared, the solvent can be drained from the channel holding the solid substance. If requited, the process can be repeated. As dissolution is diffusion limited, subsequent working solutions of the same concentration can be produced by reproducing the rate of flow of the solvent.

The solid substance to be dissolved can also be embedded in a porous silica structure formed as described above in method one (but omitting the catalyst). The solvent is passed through the porous silica structure in the same way as described above for the first embodiment of the fourth method.

Figure 7:
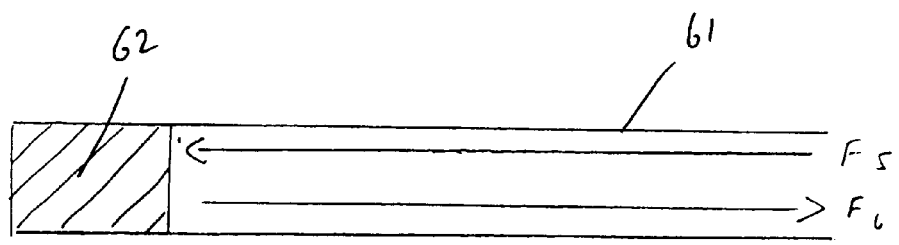
FIG. 7 is a schematic representation of a third embodiment of a method of preparing a working solution.

It will be appreciated that the fourth method may be varied. For example, as shown in FIG. 7, in a second embodiment of the fourth method, instead of using a porous solid or a solid embedded in a porous structure, the substance used to make the working solution may be immobilized in a slow release gel 62. Examples of suitable slow release gels are polyacrylamide and polysaccharides, or other gels used in electrophoresis. The working solution could be prepared by bringing a predetermined volume of a solvent into contact with the slow release gel (indicated by arrow F5) and leaving the solvent in contact with the slow-release gel 62 for a predetermined duration during which the substance dissolves to form the working solution. Suitable predetermined volumes may be, for example, in the nano-, pico- or femto- litre ranges. Suitable durations may be, for example, from about 5 seconds to about 1 minute. The working solution is then removed from contact with the gel (as shown by arrow F6). By controlling the duration of the contact between the solvent and the slow-release gel 62, working solutions of different concentrations may be prepared. This embodiment can also be performed with other forms, both porous and non-porous of substance to be dissolved.

Figure 6:
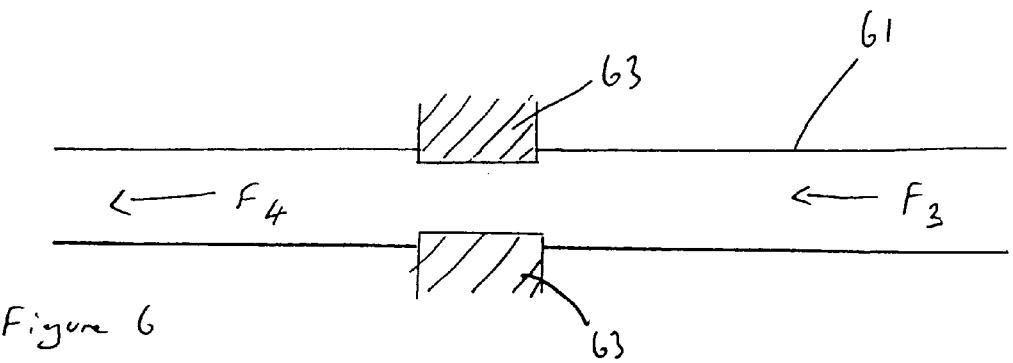
FIG. 6 is a schematic representation of a second embodiment of a method of preparing a working solution.

FIG. 6 shows a third embodiment of the fourth method. Here, a plug of non-porous solid 63 protrudes into the interior of a channel 61. Solvent is passed to the plug 63 (as indicated by arrow F3) and contacts the plug so as to dissolve solid from the plug 63 and from a working solution. The working solution is passed away from the plug (as indicated by arrow F4). This process can be a continuous flow process in which a continuous stream of working solution is produced. The concentration of dissolved solid will then be dependent on the rate of flow. Suitable flow rates may be, for example, in the range of about 1 $\mu$l/min to about 100 $\mu$l/min.

It will be appreciated that the four methods described above need not be used together. In particular, the third and fourth methods may be used, independently from one another, with chemical devices that are not manufactured by either the first or second methods. Also, the chemical devices manufactured by the first and second methods may be used to perform chemical reactions, analyses or separations without using the third or fourth methods.

We claim:

1. A method of controlling liquid movement in a chemical device comprising a first part having a groove and a second part having a surface, a region of the surface closing the groove so that the groove and the region together define a channel, a porous structure being located in the channel, the method comprising applying an electrical potential to generate an electroosmotic force in the porous structure so as to propel a liquid through the porous structure, and using the porous structure to resist or prevent flow of a liquid through the porous structure in response to hydrostatic force.

2. A method according to claim 1, wherein the liquid propelled through the porous structure and the liquid acted on by the hydrostatic force are the same, said propelling of the liquid and said resisting or preventing of flow of the liquid in response to hydrostatic force occurring simultaneously.

3. A method according to claim 2, wherein the electroosmotic flow propels the liquid in a first direction and the hydrostatic force urges the liquid to flow in a second direction opposite to the first direction.

4. A method according to claim 1, wherein said propelling and said resisting, or preventing do not occur simultaneously.

5. A method according to claim 1, wherein applying the electrical potential to generate the electroosmotic force in the porous structure so as to propel the liquid through the porous structure includes propelling the liquid through a groove containing the porous structure between the first and second parts.

6. A method according to claim 5, wherein the first part comprises a member having a surface and a coating provided on the surface, the groove interrupting the coating and extending into the member.

7. A method according to claim 1, wherein the porous structure is composed of a silica compound.

8. A method according to claim 7, wherein the porous structure was formed by reacting formamide and potassium silicate.

9. A method according to claim 1, wherein the device has a reservoir, said hydrostatic force being generated by a head of liquid above the porous structure in the reservoir.

10. A method according to claim 1, wherein a catalyst is bound to the porous structure.

* * * * *